W. V. HOEFEN.
PLOW.
APPLICATION FILED OCT. 6, 1919.

1,331,200.

Patented Feb. 17, 1920.

INVENTOR.
Walter V. Hoefen
by Ralph Donath
Attorney

UNITED STATES PATENT OFFICE.

WALTER V. HOEFEN, OF PITTSBURGH, PENNSYLVANIA.

PLOW.

1,331,200.  Specification of Letters Patent.  Patented Feb. 17, 1920.

Application filed October 6, 1919. Serial No. 328,659.

*To all whom it may concern:*

Be it known that I, WALTER V. HOEFEN, a citizen of the United States, residing at Pittsburgh, in the county of Allegheny and State of Pennsylvania, have invented certain new and useful Improvements in Plows, of which the following is a specification.

This invention relates to agricultural implements, and more particularly to a rotary plow.

One of the main objects of the invention is to provide a plow of this type of simple construction and operation having a plurality of relatively spaced plowing members which may be readily adjusted toward or away from each other as circumstances may require. Another object is to provide earth working or cutting and pulverizing members of durable and relatively light construction. A further object is to provide simple and efficient means for securing the cutters in position and for adjusting the same upon the plow members. Further objects will appear from the detailed description.

Figure 1:
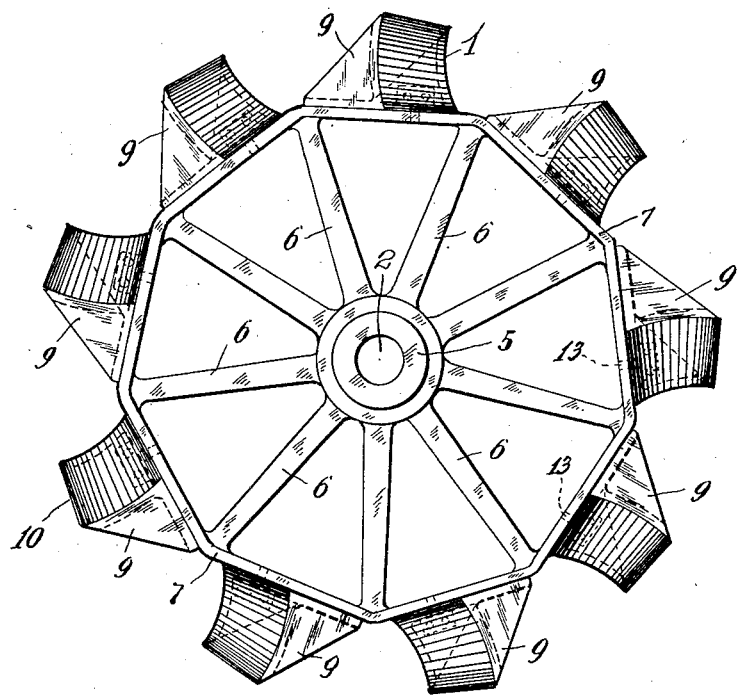
Figure 1 is a detail view of one of the plow members.
Figure 2:
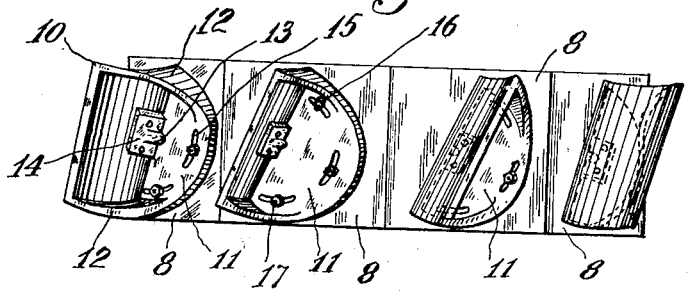
Fig. 2 is a plan view of the same.

The plow is composed of a plurality of members 1 rotatably mounted upon a shaft 2. Each of the plow members comprises a hub 5 from which radiate spokes 6 which support a rim 7 of polygonal outline to provide a plurality of flat sections 8 which support the earth working members 9. Each of these members comprises a forward cutting element or blade 10 which is slightly concaved and is provided with an integral substantially semi-circular base 11, the ends of the blade being connected to this base by reinforcing webs 12. A stud 13 fits through a corresponding opening in section 8 and is provided on its outer end with a head 14 riveted or otherwise secured to blade 10. The base is provided with a plurality of slots 15 disposed concentric with stud 13, these slots receiving securing screws 16 inserted through section 8, nuts 17 being threaded upon the outer ends of these screws. By this means, the earth working members may be readily applied or removed, as circumstances may require, and the angle of the blades 10 to the axis of the plow may be readily varied so as to give these members greater or less slant across sections 8 to suit conditions.

The adjustability of the ground working members 9 renders it possible to thoroughly pulverize the soil and to simultaneously form this soil in parallel rows or ridges for planting or other purposes. By properly spacing the plow members, these ridges may be formed at opposite sides of each of two parallel rows of plants, the plow in this case being used for hilling the plants; or the ridges may be formed close together to provide a furrow for planting purposes. Also, by adjusting the inclination of the members 9 across sections 8, the extent to which these members displace the soil laterally of the plow may be readily varied, thus permitting very accurate control of the width of the individual ridges formed and the distance apart of these ridges. As will be understood, by adjusting members 9 parallel with the axis of the plow there will be no lateral displacement of the soil, the plow being used, in this case, for working and pulverizing purposes only.

What I claim is:

1. In a rotary plow, a wheel including a polygonal rim, digging members mounted on the respective faces of the rim each including a base fitting flat on the rim and a blade carried thereby, and means for securing the base to the rim and for adjusting said base for varying the angularity of the blade to the rim.

2. In a rotary plow, a wheel including a polygonal rim, a plurality of digging members mounted on the respective faces of the rim each including a base and an outwardly projecting blade carried thereby, said blade being pivoted at the center of its inner edge to the rim, and means for adjusting the base about said pivot.

3. In a rotary plow, a wheel including a polygonal rim, a plurality of digging members mounted on the respective faces of the rim each including a base and an outwardly projecting blade carried thereby, a stud secured to said blade and extending through the rim, said base being provided with slots concentric with said stud, bolts passed through said rim and extending through the slots, and nuts coöperating with said bolts for securing the base in adjustment about said stud.

In testimony whereof I affix my signature.

WALTER V. HOEFEN.